Aug. 14, 1962 W. H. ZINN 3,049,484
APPARATUS FOR PRODUCTION OF RADIOACTIVE ISOTOPES
Filed Nov. 1, 1957 2 Sheets-Sheet 1

Inventor
WALTER H. ZINN
by: J. Richard Cavanaugh

Aug. 14, 1962  W. H. ZINN  3,049,484
APPARATUS FOR PRODUCTION OF RADIOACTIVE ISOTOPES
Filed Nov. 1, 1957  2 Sheets-Sheet 2

Inventor
WALTER H. ZINN
by: J. Richard Cavanagh

United States Patent Office 3,049,484
Patented Aug. 14, 1962

3,049,484
APPARATUS FOR PRODUCTION OF
RADIOACTIVE ISOTOPES
Walter H. Zinn, Belleair, Fla., assignor, by mesne assignments, to Curtiss-Wright Corporation, New York, N.Y., a corporation of Delaware
Filed Nov. 1, 1957, Ser. No. 693,920
Claims priority, application Canada Oct. 31, 1957
5 Claims. (Cl. 204—193.2)

This invention relates to an inseparable non-critical reactor unit which may be provided in rod-like form for the primary production of radioactive isotopes and which is adapted to be destroyed after removal from a nuclear reactor to extract the radioactive isotopes therefrom. The invention also concerns the method of producing radioactive isotopes as set forth herein.

The usual reactor comprises a reaction vessel into which is placed a critical amount of fissile material usually in the form of a plurality of rods, each of which contains a non-critical or less than critical or less than critical amount of fissile material but which in total comprise an excess above a critical amount necessary to the fission reaction. The large amount of heat realized by the fission reaction is drained off in controlled reaction processes generally by utilizing a coolant. In industrial reactors. it is convenient to utilize water as a coolant and moderator of the fission reaction since it also acts as a reflector having properties adapted to contain most of the neutron flux within the reaction vessel. The operating level of the reactor is additional controlled by the use of neutron absorber materials in relatively small amounts. In concept, therefore, prior art reactor structures are characterized by the provision of a vessel into which non-critical fissile components are placed in sufficient quantity to go critical and a coolant serves also as a moderator to determine the average energy of the neutrons in the apparatus. Control elements are additionally applied to maintain the operating level of the reaction, having regard to a number of factors including the accumulation of poisons.

The invention embraces a different concept in that radioactive products are formed as a primary product from absorber material exposed to the fission process in a plurality of reactor units of a non-critical type in such a way that the absorber material which is an integral part of the non-critical assembly may be removed by and only by mechanical destruction.

A plurality of such reactors is adapted to achieve criticality of the fissible material and to achieve a fission reaction for the primary production of isotope materials as hereinafter set forth but from which heat energy is obtainable as a by-product in relatively large quantities.

Having regard to the aforesaid concept, it is the main object of the present invention to provide a non-critical reactor unit having a structure of inseparable destructible form in regard to the fissile material and neutron absorber components thereof.

It is another object of the invention to provide a reactor unit as set forth herein, in which the mass of absorber material present having regard to its absorption cross-section for neutron capture, is in predetermined ratio to the mass of fissile material therein and constructed for the extraction of excess heat energy by a predetermined moderator-coolant flow therethrough and wherein the said ratio provides a substantial optimum of conversion of fissile fuel energy to isotopes and substantially controls the fission reaction to a safe operating level at a conversion ratio between about 0.4 and 0..9

Figure 1:
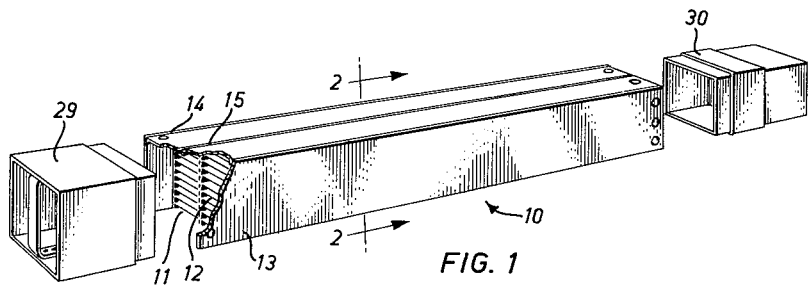
FIGURE 1 is an exploded perspective view of a preferred form of inseparable non-critical reactor unit of the invention showing the end fittings thereof ready for assembly and partially cut away to reveal detail.

An isotope producing reactor unit according to the invention is designated by the numeral 10 in FIGURE 1 and comprises a plurality of rigid elongated spaced apart support plates or members 11 and 12 inseparably and rigidly connected as by welding to sheet aluminum side walls 13, 14 and 15. The spaces 16 and 17 between the support members communicate coolants such as water adapted also for service as a moderator between the support members for the full length of the unit. The support member stacks 18 and 19 are similar, each being formed of support members, certain of which carry therein fissile material such as U 235 indicated by the solid ink line 20.

Figure 2:
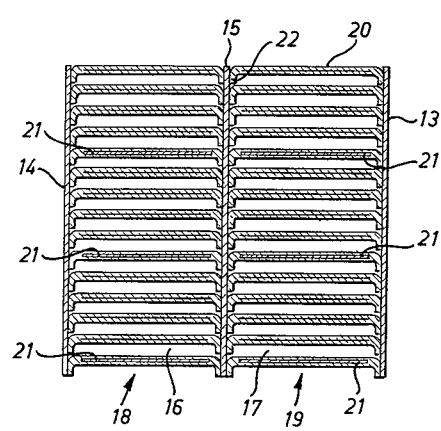
FIGURE 2 is a sectional view on the line 2—2 of FIGURE 1.

The reactor unit construction shown in section in FIGURE 2 is of substantially square outside dimensions and of a length of approximately ten times the width dimension. The spacing between the support members is approximately one-twentieth of the width dimension. Regardless of the size of the reactor unit shown, it will be understood, according to this invention, that the total amount of U 235 contained within one unit will be less than a critical amount; that is, less than about two kilograms.

Each of the support members is formed for example of aluminum tubing pressed substantially flat to enclose therewithin, the material to be supported; that is, the fissile material 20 in certain of said members and an absorber material 21 in others of said members.

The absorber material 21 preferably comprises a sheet of cobalt metal of such thickness that the weight thereof is in predetermined relationship to the weight of fissile material present in the reactor unit. As shown, the side edges of the flattened tubes forming the support members are turned downwardly and spot welded by their downturned flanges 22 to the side wall supporting means 13, 14 and 15 respectively.

The reactor unit of the invention is intended primarily for the production of isotopes of various absorber materials and particularly cobalt. The optimum production of isotopes will depend upon a number of complex factors. According to the invention the mass of cobalt present when utilized as an absorber within the reactor unit should be of the order of about twice the mass of fissile material. In the form of reactor units shown in FIGURES 1 and 2, the weight of cobalt is about 1.75 times the weight of U 235. Generally, any other absorber material should be used in such amount as to give an equivalent absorption cross-section for neutron capture assuming all other conditions to be constant. Skilled persons will, therefore, appreciate that the definition of order of magnitude of cobalt–U 235 mass ratio herein given will enable practice of the invention having regard to the usual design features involving the characteristics of the coolant and moderator employed, reactor geometry and the like, as well as the quality of the particular isotope being produced.

The reactor unit itself may take a variety of geometric forms. Thus the modification shown in FIGURE 2 wherein like numerals indicate like components, embraces a modified absorber support member 23 formed in similar manner from a pressed aluminum tube but in which the latter is formed about rods 25 of absorber material.

Again the mass ratio having regard to absorption cross section for neutron capture is adhered to.

It will be observed that the isotope producing reactor unit of the invention, once assembled, cannot release the absorber material unless the reactor unit is at least partially destroyed. Destruction of the reactor unit shown in FIGURE 2 is accomplished by cutting the side walls between the support plates or cutting the support plates themselves adjacent the side flanges thereof. Severance of the side walls will accomplish a ready separation of the absorber carrying support plates after conversion to isotope form.

Figure 3:
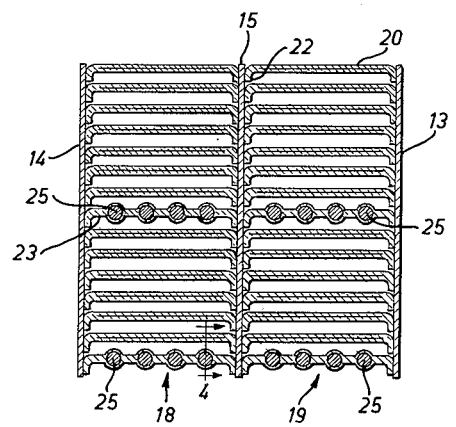
FIGURE 3 is a sectional view of a modification of the structure of FIGURE 2.
Figure 4:
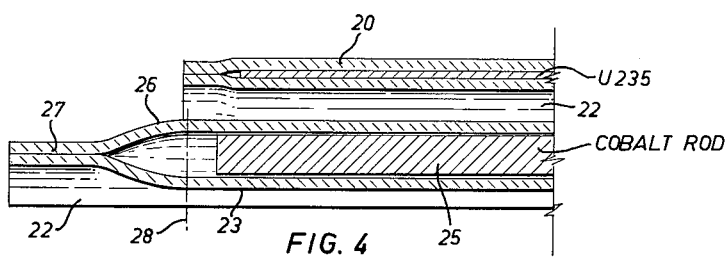
FIGURE 4 is a detail enlarged section of FIGURE 3 but at the ends of the support plates thereof.

The absorber rods 25, when converted to isotope form, are removed from the structure of FIGURE 3 preferably by severing the support plates 23 as shown in FIGURE 4. In the example illustrated one end 26 of a support plate 23 is crimped as at 27 to retain the absorber rod 25 therein and is adapted to be severed along the line 28 for slidable removal of the rod loosely enclosed therein.

It must be apparent that a variety of geometry is available to skilled persons in the formation of inseparable reactor units according to the invention and wherein the outer casing such as the side walls of the unit shown or the support plates, must be severed before the isotope products can be removed therefrom. The absorber supporting member, whatever geometric form it may take, is destroyed or physically severed in some way, only then enabling the removal or release of the isotope product therefrom.

The reactor unit 10 preferably carries end mounting fittings 29 and 30 formed of sheet metal and preferably spot welded thereto. The end fittings 39 and 30 are hollow and are adapted to seat in suitable sockets or guideways on support frames 31 and 32 of a reactor vessel 34 of any generally conventional mechanical form such as that shown in FIGURE 5. A plurality of reactor units 10 are shown inserted in the frames 31 and 32 of FIGURE 5. A sufficient number of reactor units is inserted in the vessel 34 to provide substantially more than a critical mass of fissile material in the vessel. Adjustable control rods 35 carry control members 36 preferably formed according to the invention of the same absorber material as that placed in the reactor units and divide the reactor vessel grid 37 into four quadrants, each of which preferably contains less than a critical amount of U 235 when fully loaded. While only four control members 36 are shown, it is intended, according to this invention that the reactor grid be divided into a large number of segments, thereby enabling safe loading for high levels of conversion ratio. By reason of the inherent large amount of absorber in each reactor unit of the invention, the reactor vessel 34 for a given geometry will contain a far greater amount of U 235 than could be handled safely by so-called power reactors utilized primarily for the generation of steam and power.

Figure 6:
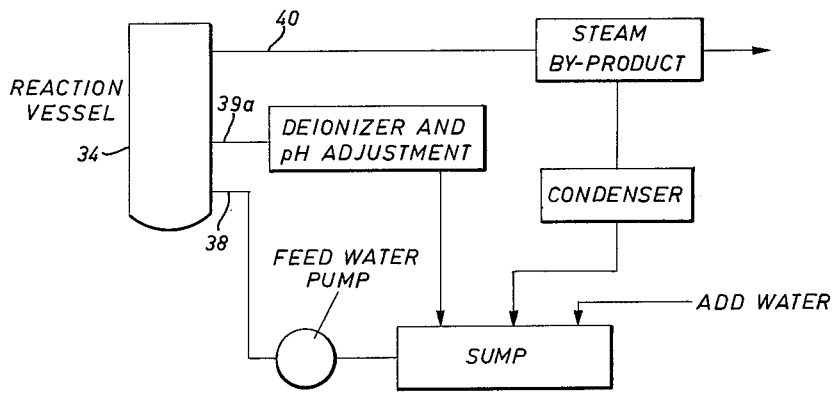
FIGURE 6 is a flow diagram of reaction vessel operation according to the invention.
Figure 5:
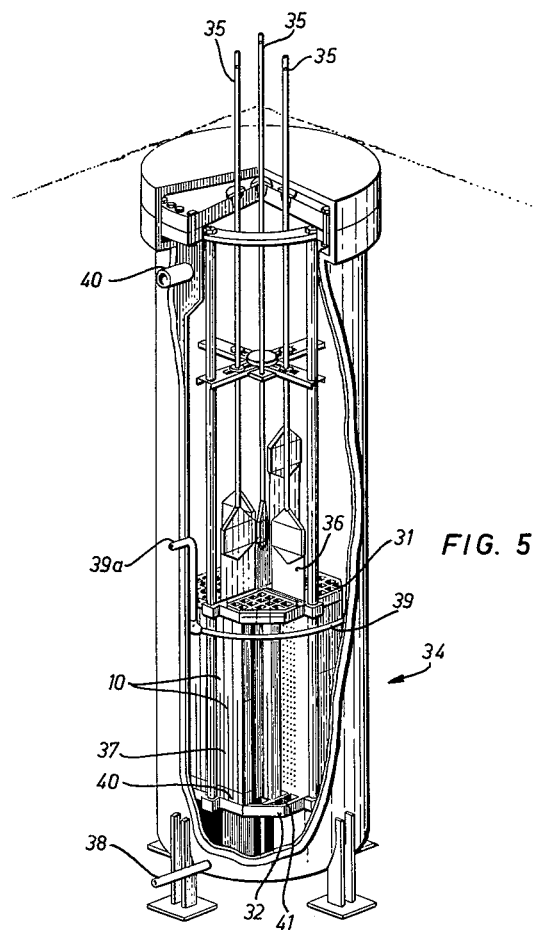
FIGURE 5 is a cut away perspective of a conventional reaction vessel mechanical structure adapted to utilize the reactor units of the invention therein.

The mechanical construction of the vessel shown in FIGURE 5 is similar to that utilized in conventional power reactors and needs no additional comment aside from pointing out that it is preferred, according to the invention, that water be utilized as the moderator and cooling medium, in view of its reflecting and radiation-containing properties. In accordance with the art of such structures, pipe 38 connects to a suitable instrument for measuring water level above the bottom of the pressure reactor vessel 34. The ring-like pipe 39 distributes feed water from the feed water inlet pipe 39a introducing water to the vessel at a controlled rate to maintain a predetermined level therein. The water in the lower regions of vessel 34 therefore surrounds the reactor units 10 in support frames 31 and 32 serving as a reflecting medium and also as a moderator and coolant communicated through the spaces 16 and 17 between the support plates of the reactor units. The heat released by the fission reaction is removed from vessel 34 by releasing generated steam through outlet 40. As shown in FIGURE 6, steam representing energy, is available as a useful by-product. A condenser returns water to a sump to which water may be added from time to time. The feed water pump delivers water from the sump to inlet tube 39a of vessel 34 at a predetermined rate determined by reactor geometry and desired operation power level having regard to start-up techniques known to skilled operators. The water level outlet pipe 38 provides return water to the sump through conventional deionizing and pH control equipment to maintain the characteristics of the water used.

Since upon knowing one geometry for a desired kind of reaction, a variety of geometry is available to skilled persons with a variety of materials subject to established methods of design construction and operation, other designs of reactor unit may be derived from that disclosed herein having regard to the following comments.

The preferred construction of reactor unit as shown in FIGURES 1 to 4 contains less than one kilogram of U 235. Having regard to a number of complex factors and for operation according to the invention, each unit preferably contains as much as for example 0.6 kilogram of U 235 in oxide or other suitable form, such as in alloy form with aluminum distirbuted over 24 support plates each two inches wide and forty inches long. Cobalt in suitable form such as cobalt metal is inseparably distributed within the reactor unit as described in a mass ratio to U 235 of the order of 1.75 to 2. Therefore approximately 1.0 kilogram of cobalt in sheet or rod form is supported in an array of geometric symmetry within each reactor unit preferably for the full length of fuel or U 235 and beyond, as indicated in FIGURE 4 to enable some neutron absorption of neutrons scattered from the coolant.

The sectional area of the reactor unit for coolant flow in the structures shown in FIGURES 2 and 3 is about sixteen square inches.

In operation, the reaction vessel 34 is loaded with a much greater mass of fuel than heretofore. An economic size of reaction vessel may utilize an array of sixty reactor units totaling forty kilograms of U 235 operating at a high conversion ratio of 0.6 or greater and preferably as close to the maximum of 1.0 as possible. In this connection, however, while in an abstract theoretical sense the presence of a large proportionate mass of absorber obviates the necessity of control rods, it is necessary from a practical point of view, particularly when starting up, to utilize control rods of the same absorber material such as cobalt in the present example of a total mass as high as one fifth the total mass of cobalt contained in the reactor units loaded into the reaction vessel.

While there has been described what is at present considered a preferred embodiment of the present invention, it will be appreciated by those skilled in the art that various changes and modifications can be made therein without departing from the essence of the invention and it is intended to cover herein all such changes and modifications as come within the true spirit and scope of the appended claims.

What I claim as my invention is:

1. For use in a reactor, an isotope producing reactor unit comprising: spaced side walls; a plurality of fuel plates rigidly secured to said side walls in a spaced parallel relation for communication of a coolant moderator between said fuel plates, each of said fuel plates containing a mass of fissile material, the total mass of said fissile material contained in said fuel plates being a noncritical mass of said fissile material; and a plurality of absorber plates rigidly secured to said side walls in spaced, parallel relation and interposed between said fuel plates, each of said absorber plates containing a mass of absorber material, the total mass of said absorber material contained in said absorber plates having an absorption cross-section for neutron capture equivalent to that of a mass of cobalt about twice the mass of said fissile material in said fuel plates.

2. Apparatus for the production of radioactive isotopes as a primary product comprising: a reaction vessel; means for passing a coolant moderator through said reaction vessel; a plurality of reactor units as defined in claim 1, each reactor unit containing a noncritical mass of fissile material and a mass of absorber material having an absorption cross-section for neutron capture equivalent to that of a mass of cobalt about twice the mass of said fissile material in each of said reactor units, whereby the combined mass of absorber material in said plurality of reactor units is converted to isotope form when the combined mass of fissile material of said plurality of reactor units is greater than the critical mass of said fissile material in said reactor units.

3. Apparatus as defined in claim 2 including control rods for controlling the reaction in said vessel, said control rods being formed of the same absorber material as in said reactor unit.

4. Apparatus as defined in claim 1 in which each of said fuel plates comprises a mass of fissile material encased in a flattened tube, and each of said absorber plates comprises a mass of absorber material encased in a flattened tube, the edges of said flattened tubes being rigidly secured to said side walls.

5. Apparatus as defined in claim 4 in which each of said absorber plates comprises a mass of absorber material in the form of a rod encased in a flattened tube the edges of said flattened tube being rigidly secured to said side walls.

References Cited in the file of this patent
FOREIGN PATENTS 159,720    Australia _____ Nov. 10, 1954

OTHER REFERENCES

Proceedings of the International Conference on the Peaceful Uses of Atomic Energy, held in Geneva, August 8–20, 1955; article by Weinberg et al. vol. II, pages 402–405, 417–418; article by Lichtenberger et al.; vol. III, pages 345–348.

AECD 3682, June 5, 1955, declassified October 15, 1955, pages 8, 9, 10, 11, 12, 49 and 55.

AECD 3731, October 14, 1955, declassified November 10, 1955, pages 15, 16, 37 and 38.